Feb. 6, 1940. W. M. R. FARMER 2,189,631
INDICATOR
Filed May 11, 1939
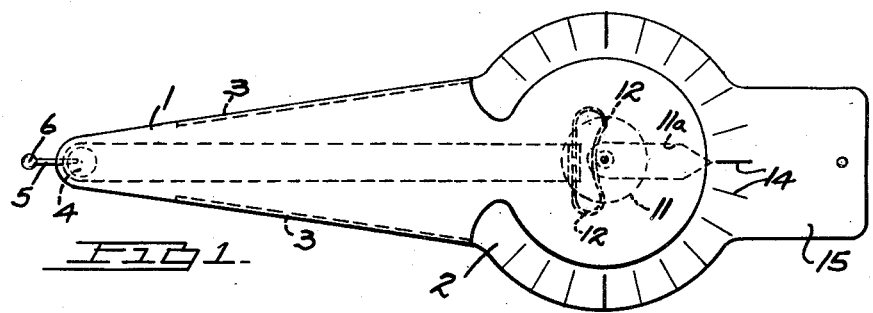
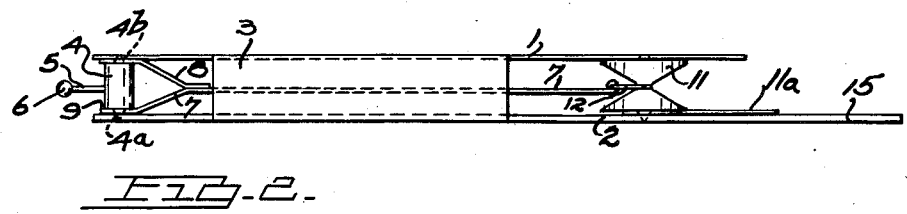
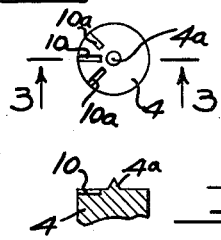 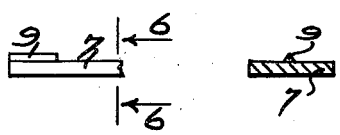
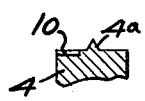
INVENTOR.
William M. R. Farmer
BY
ATTORNEY.

Patented Feb. 6, 1940

2,189,631

UNITED STATES PATENT OFFICE 2,189,631

INDICATOR

William M. R. Farmer, Wyandotte, Mich.

Application May 11, 1939, Serial No. 273,137

10 Claims. (Cl. 33—172)

This invention relates to improvements in indicators. It is an object of the invention to provide an indicator wherein movement of the contact member in either direction is frictionally transmitted to the pointer through a single spring member.

Another object of the invention is to provide such an indicator wherein the pointer is mounted upon a spool which is frictionally engaged for rotation by a curved spring member so that movement of the contact member in either direction is transmitted to the spool through the spring member; and wherein the curvature of the spring member is such that its frictional bearing against the spool increases as the contact member and pointer travel away from their normal positions. Thus the spring member returns the contact member and pointer to their normal positions when pressure against the former is released.

A further object of the invention is to provide an indicator wherein the contact member is resiliently supported so that it may be set to extend at different angular positions from the indicator without altering the setting of the pointer.

Yet another object of the invention is to provide an indicator which is made of relatively few parts, and which is simple to manufacture and assemble, and reliable in operation.

Having thus broadly and briefly stated some of the objects and advantages of the invention I will now proceed to describe a preferred embodiment thereof with the aid of the accompanying drawing, in which:

Figure 1 illustrates a front elevation of the invention, and

Figure 2 is a side elevation thereof.

Figure 3 is a partial section on the line 3—3 of Figure 4.

Figure 4 shows an enlarged plan view of the roller.

Figure 5 is an enlarged side elevation of one extremity of the arm, and

Figure 6 is a section on the line 6—6 of Figure 5.

Referring to the drawing, 1 and 2 designate two plates, forming a frame, which are held in spaced parallel relation to one another; in the present instance this is accomplished by providing opposed flexed margins 3 on the plate 1 intermediately of its length of the longitudinal edges of which are welded, or otherwise suitably secured, to the edge faces of the plate 2. Mounted for rotation between the plates 1 and 2 towards one extremity of the indicator is a roller 4, and extending radially from the latter is a pin 5 upon the outer extremity of which a contact member 6, preferably of spherical form, is secured.

7 denotes a resilient arm which extends substantially between the plates 1 and 2 throughout the greater portion of their length. This arm is offset towards one extremity and apertured for the passage of a trunnion 4a extending from the roller which is supported in the plate 2. This extremity of the arm 7 is held against the adjacent end of the roller by its own resilience. Secured to the arm 7 adjacent the roller 4, and usually welded thereto is a clamp arm 8 which is apertured for the passage of the other trunnion 4b and extends between the plate 1 and the adjacent face of the roller 4. Provided upon the arm 7 is a key 9 which in Figure 1 is shown in engagement with the keyway 10 formed in the adjacent face of the roller 4 so that the pin 5 lies substantially in longitudinal alignment with the arm 7. In order that this pin 5 may extend from its roller 4 at different inclinations to the arm 7 other keyways 10a are also provided in the face of the said roller either of which may be engaged by the key 9 by turning the roller when the arm 7 is outwardly sprung.

Supported by and between the plates 1 and 2 for rotation towards their opposite extremities is a V-shaped spool 11. Supported by the adjacent extremity of the arm 7, which in the present instance is folded thereover, are both extremities of a looped spring member 12 the intermediate portion of which is in engagement with the central portion of the spool periphery. It will also be noted that the intermediate portion of the spring member 12 is curved about an axis parallel to the axis of the spool, and that its curvature is about a larger radius than that of the spool. Consequently as the arm 7 swings about the axis of the roller 4 not only is the spool 11 rotated by the frictional contact of the spring member 12, but this frictional contact increases, due to the larger radius of the spring member, as the arm 7 moves to a greater inclination from its position shown in Figure 1. Thus when the contact member 6 by which the arm 7 is moved is released the curvature of spring member 12 returns both the arm 7 and a pointer 11a secured to the spool 11 to their normal positions.

The plate 2 is provided with a plurality of suitably spaced graduations 14 which extend radially from the axis of the spool 11 and with which the pointer 11a is adapted to register. In order to render these graduations readily visible the plate 1 at that extremity of the indicator is made smaller than the plate 2, which also has an extension 15 thereon for facilitating its attachment to a machine.

In order that good frictional contact may be made between the intermediate portion of the spring member 12 and the peripheral portion of the spool 11 which it contacts I prefer to roughen both these coacting parts by sand blasting and thus eliminate any possible slippage.

From the foregoing it will be readily seen that I have devised a simple form of indicator wherein the movement of the contact member in either direction is transmitted to the pointed through a spring member which is so formed that when the contact member is released the said spring member returns both the contact member and the pointer to their initial positions.

While the preferred construction of the invention has been described and shown it is understood that alterations and modifications may be made thereto provided the said alterations and modifications fall within the scope of the appended claims.

What I claim is:

1. An indicator comprising a frame having an arm pivoted thereon, a contact member supported for movement about the arm axis and so connected to said arm that movement of the member turns the arm, a spool mounted for rotation on the frame, a pointer carried by the spool, a spring member carried by the arm in frictional contact with the spool periphery whereby movement of the arm about its axis turns the spool, and said frame having graduations thereon with any of which said pointer is adapted to register.

2. An indicator comprising the combination set forth in claim 1, wherein the spring member is so formed that movement of the contact member about its axis in either direction imparts rotation to the spool.

3. An indicator comprising the combination set forth in claim 1, wherein the spring member is so formed that it tends to return the spool and arm to their normal positions.

4. An indicator comprising the combination set forth in claim 1, wherein the spring member is so formed that its frictional contact with the spool increases as the arm and spool turn away from their normal positions.

5. An indicator comprising a frame having an arm pivoted thereon, adjacent one extremity of the latter, a spring member carried by the other extremity, a spool mounted for rotation on said frame and having a pointer thereon, said spring member having a curved intermediate portion which is resilient and in frictional contact with the spool periphery whereby movement of the arm about its axis turns the spool, said frame having graduations thereon with any of which said pointer is adapted to register, and a control member adapted to move with the arm about the axis of the latter.

6. An indicator comprising the combination set forth in claim 5, wherein the axis of the curved intermediate portion of the spring member is parallel with the axis of the spool.

7. An indicator comprising the combination set forth in claim 5, wherein the axis of the curved intermediate portion of the spring member is parallel with the axis of the spool, and the radius of said curved intermediate portion is greater than that of the portion of the spool periphery contacted by the spring member.

8. An indicator comprising a frame, an arm pivoted thereon, a contact member pivoted about the arm axis, and connected to said arm whereby movement of the member turns said arm, a spool mounted for rotation on the frame, a pointer carried by the spool, said frame having graduations thereon with any one of which the pointer is adapted to register, and a spring member carried by the arm by which the spool is rotated in one direction or the other according to the direction in which the contact member is moved about its axis.

9. An indicator comprising a frame, an arm pivoted thereon, a contact member pivoted about the arm axis, frictional means holding the member at any one of a plurality of selective angular positions relative to the arm, a spring member carried by the arm, a spool mounted for rotation on the frame adapted to be turned by the spring member upon movement of the arm, a pointer on the spool, and said frame having graduations thereon with any one of which the pointer is adapted to register.

10. An indicator comprising two parallel plates held in spaced parallel relation, a roller mounted for rotation between the plates and supported thereby, a contact member mounted on the roller and extending radially therefrom, an arm mounted for rotation with the roller, a V-shaped spool mounted for rotation between the plates and supported thereby, a spring member the extremities of which are engaged by the arm, the intermediate portion of said spring member being in frictional contact with the spool periphery whereby movement of the contact member about its axis imports rotation to the spool through the spring member, a pointer carried by the spool, and one of said plates having graduations thereon with any one of which said pointer is adapted to register.

WILLIAM M. R. FARMER.